US012201976B2

(12) United States Patent
Taher et al.

(10) Patent No.: US 12,201,976 B2
(45) Date of Patent: Jan. 21, 2025

(54) MICROFLUIDIC DEVICE

(71) Applicant: IMEC VZW, Leuven (BE)

(72) Inventors: Ahmed Taher, Heverlee (BE); Benjamin Jones, Kessel-Lo (BE)

(73) Assignee: IMEC VZW, Leuven (BE)

( * ) Notice: Subject to any disclaimer, the term of this patent is extended or adjusted under 35 U.S.C. 154(b) by 395 days.

(21) Appl. No.: 17/127,985

(22) Filed: Dec. 18, 2020

(65) Prior Publication Data

US 2021/0187504 A1 Jun. 24, 2021

(30) Foreign Application Priority Data

Dec. 20, 2019 (EP) .................................... 19218781

(51) Int. Cl.
*B01L 3/00* (2006.01)

(52) U.S. Cl.
CPC . *B01L 3/502715* (2013.01); *B01L 2200/0621* (2013.01); *B01L 2200/14* (2013.01);
(Continued)

(58) Field of Classification Search
CPC ....... B01L 2200/0652; B01L 3/502715; B01L 3/502761; B01L 2300/0816; B01L 2400/086; B01L 2200/0621; B01L 3/502746; B01L 2200/0668; B01L 2300/046; B01L 2300/0681; B01L 2400/06; B01L 3/5027; B01L 3/50273; B01L 3/502753; B01L 2200/027; B01L 2200/14; B01L 2200/16; B01L 2300/08;
(Continued)

(56) References Cited

U.S. PATENT DOCUMENTS

2004/0072278 A1* 4/2004 Chou ................ G01N 15/1456 435/29
2009/0220948 A1 9/2009 Oviso et al.
(Continued)

FOREIGN PATENT DOCUMENTS

EP 2444157 A1 4/2012
EP 2572788 A1 3/2013
(Continued)

OTHER PUBLICATIONS

European Search Report for Application No. 19218781.3, dated Apr. 7, 2020.

*Primary Examiner* — Dean Kwak
(74) *Attorney, Agent, or Firm* — MOSER TABOADA

(57) ABSTRACT

A microfluidic device (100) comprises: a reaction chamber (102); at least a first and a second supply channel (110*a*, 110*b*) for allowing transport of a first fluid and a second fluid, respectively, from a fluid supply source (112*a*, 112*b*) into the reaction chamber (102), wherein each of the first and the second supply channels (110*a*, 110*b*) comprises a side drain (114*a*, 114*b*) connected to the supply channel (110*a*, 110*b*) between the fluid supply source (112*a*, 112*b*) and the reaction chamber (102), wherein the side drain (114*a*, 114*b*) is configured to prevent undesired diffusion of the fluid in the supply channel (110*a*, 110*b*) into the reaction chamber (102); at least a first and a second outlet (120*a*, 120*b*) connected to the reaction chamber (102) for allowing transport of fluid from the reaction chamber (102), wherein the first and second outlets (120*a*, 120*b*) have different dimensions to provide different hydraulic resistance.

11 Claims, 4 Drawing Sheets

(52) U.S. Cl.
CPC ... *B01L 2200/16* (2013.01); *B01L 2300/0867* (2013.01); *B01L 2400/08* (2013.01)

(58) Field of Classification Search
CPC ..... B01L 2300/0861; B01L 2300/0867; B01L 2300/0877; B01L 2400/08; B01L 2300/0636; B01L 2300/0864; B01L 2400/084; B01L 2200/0605; B01L 2300/0819; B01L 2400/0622; B01L 2400/082; B01L 2200/10; G01N 15/1056; G01N 2015/1081
See application file for complete search history.

(56) References Cited

U.S. PATENT DOCUMENTS

| | | | | |
|---|---|---|---|---|
| 2009/0268548 | A1 | 10/2009 | Hartmann et al. | |
| 2010/0035292 | A1* | 2/2010 | Levhenko | G01N 27/44791 435/29 |
| 2014/0057311 | A1 | 2/2014 | Kamm et al. | |
| 2016/0354777 | A1* | 12/2016 | Chiu | B01L 3/5027 |
| 2019/0118182 | A1 | 4/2019 | Weitz et al. | |
| 2019/0201893 | A1* | 7/2019 | Jones | B01L 3/502738 |

FOREIGN PATENT DOCUMENTS

| | | | |
|---|---|---|---|
| EP | 3505248 | A1 | 7/2019 |
| WO | WO-03/013703 | A1 | 2/2003 |

* cited by examiner

MICROFLUIDIC DEVICE

CROSS-REFERENCE TO RELATED APPLICATION

The present application claims priority based on European Application No. 19218781.3, filed on Dec. 20, 2019, which is incorporated herein by reference.

TECHNICAL FIELD

The present inventive concept relates to a microfluidic device.

BACKGROUND

Microfluidic devices are miniaturized devices which allow e.g. analyzing chemical reactions in a very small scale and compact system. The microfluidic devices may be used e.g. for mixing fluids and reagents in a small volume for analysis of reactions.

In microfluidic devices, fluids may be transported to a reaction chamber. Thus, a first fluid and a second fluid may need to be sequentially provided into the reaction chamber. It is desired to enable fast and well-controlled replacement of the fluids in the reaction chamber. This may enable a short process time for assays and this may also reduce waste of fluids, since there may not be a need to provide an excessive amount of the fluid to be introduced into the reaction chamber in order to ensure that the fluid in the reaction chamber is completely replaced.

In particular, for chemical reactions such as DNA synthesis, multiple reagents may need to be loaded and washed from the reaction chamber in sequence quickly (to increase throughput) and in high purity (to reduce error in synthesis). High purity levels may be achieved using microfluidic valves arranged external to a chip providing the reaction chamber. In such case, replacement of fluids may take a very long time due to a high dead volume that needs to be replaced.

SUMMARY

An objective of the present inventive concept is thus to enable fast switching of fluids in a reaction chamber of a microfluidic device.

This and other objectives of the present inventive concept are at least partly met by the invention as defined in the independent claims. Preferred embodiments are set out in the dependent claims.

According to an aspect, there is provided a microfluidic device comprising: a reaction chamber; at least a first supply channel and a second supply channel connected to the reaction chamber for allowing transport of a first fluid and a second fluid, respectively, from a fluid supply source into the reaction chamber, wherein each of the first supply channel and the second supply channel comprises a side drain connected to the supply channel between the fluid supply source and the reaction chamber, wherein the side drain is configured to provide a flow away from the supply channel so as to prevent undesired diffusion of the fluid in the supply channel into the reaction chamber; at least a first outlet and a second outlet connected to the reaction chamber for allowing transport of fluid from the reaction chamber when changing the fluid that is to fill the reaction chamber, wherein the first outlet and second outlet have different dimensions so as to provide different hydraulic resistance.

Thanks to the reaction chamber being provided with at least a first outlet and a second outlet having different hydraulic resistance, the reaction chamber may be designed so as to facilitate fast replacement of the fluid in the reaction chamber. When the reaction chamber is filled with a first fluid which is to be replaced by the second fluid, a fluid front of the second fluid entering the reaction chamber may, thanks to the different hydraulic resistances of the outlets, simultaneously reach the outlets. Thanks to the fluid front reaching the outlets simultaneously, the second fluid may thus also reach side surfaces of the reaction chamber simultaneously such that the second fluid very quickly fills the reaction chamber.

It should be realized that a shape of the reaction chamber and positions of the supply channels and the outlets may be designed in many different ways. Placement of the outlets and the hydraulic resistance of the outlets may be selected in attempt to avoid the first fluid to be replaced from being arranged at a side surface of the reaction chamber between two outlets and surrounded by the second fluid having reached both outlets. If the first fluid is arranged at the side surface of the reaction chamber and surrounded by the second fluid, it may take a long time before the first fluid is completely removed from the reaction chamber. Depending on a selected shape of the reaction chamber and positions of the supply channels, the position of the outlets and the hydraulic resistances of the outlets may be selected so as to promote a fast replacement of fluids in the reaction chamber.

Use of different hydraulic resistances of the outlets enables a fast replacement of fluids in many different designs of the reaction chamber. It should therefore also be realized that design choices of the reaction chamber may be done in different orders, such as first setting the shape and size of the reaction chamber and thereafter setting the placement and number of outlets and supply channels of the reaction chamber. According to an alternative, the placement and number of outlets and supply channels of the reaction chamber may first be set and thereafter the shape of the reaction chamber may be set. Also, it should be realized that the shape of the reaction chamber and positions of the supply channels and the outlets may be selected based on other factors, e.g. relating to available space in the microfluidic device and the chemical reaction to take place in the reaction chamber. The hydraulic resistances of the outlets may then be set in order to achieve a fast replacement of fluids.

It should also be realized that the hydraulic resistances need not necessarily be designed such that an optimum speed of replacement of fluids is provided. However, by having different hydraulic resistances of the outlets, the speed of replacement of fluids may be improved to a sufficient or acceptable extent. Hence, the hydraulic resistances of the outlets need not be set such that the fluid front of the second fluid entering the reaction chamber needs to approximately simultaneously reach the outlets. Rather, the fluid front may reach the outlets at quite different times while still ensuring that the speed of replacement of fluids is acceptable.

According to an embodiment, the microfluidic device comprises a plurality of supply channels, each of the supply channels comprising a side drain, wherein the first and second outlets are separate from side drains of the supply channels.

Thanks to each of the supply channels comprising a side drain, a high purity in the reaction chamber may be provided. The side drain may be configured to provide a flow away from the supply channel so as to prevent undesired diffusion of the fluid in the supply channel into the reaction chamber. In particular, an undesired fluid in the reaction chamber may be prevented to reach the reaction chamber from the supply channel connected to the fluid supply source of the undesired fluid thanks to the side drain. Thus, a flow speed of the undesired fluid in the supply channel may be set such that the fluid is entirely transported to the side drain. The fluid in the reaction chamber may diffuse into the supply channel to the side drain to be partly transported away by the side drain, but the fluid flows may be set such that the undesired fluid in the supply channel does not reach the reaction chamber. This implies that the supply channel may be filled by the undesired fluid from the supply source to the side drain. Hence, when a fluid in the reaction chamber is to be replaced, there is no need to replace a high dead volume before the fluid can reach the reaction chamber.

As used herein, the term "microfluidic device" should be construed as a device having structures in dimensions of mm-scale or less and which is configured to manipulate small volumes of fluid, such as in the order of ml or μl. The microfluidic device may comprise channels having a size (cross-section) in a range of 100 nm or less to 500 μm. The use of channels in such small dimensions allows a great number of channels in a small area, such that large amounts of information from analysis may be gathered from a small area of the device.

As used herein, the term "fluid" should be construed as any medium that is capable of flowing, such as a liquid or a gas. In some embodiments, the fluids may be liquids.

According to an embodiment, a DNA memory or storage device is provided comprising the microfluidic device of the first aspect.

The microfluidic device may be particularly advantageous to use in a DNA memory storage device, since the microfluidic device provides very quickly replacement of fluids in the reaction chamber, which may be used for providing fast read and write processes in a DNA memory storage device.

According to another embodiment, the microfluidic device may be used for DNA sequencing by synthesis. Again, the fast replacement of fluids in the reaction chamber may be particularly advantageous for use in DNA sequencing by synthesis.

According to an embodiment, the second outlet is arranged farther away from the first supply channel and the second supply channel than the first outlet, wherein the second outlet has a lower hydraulic resistance than the first outlet.

A diffusion distance from the first supply channel to the second outlet is larger than the diffusion distance from the first supply channel to the first outlet. Thanks to setting the hydraulic resistance of the second outlet lower than the first outlet, a speed of diffusion towards the second outlet will be larger than the speed of diffusion towards the first outlet. This may imply that a fluid front of the first fluid may reach the first and second outlets simultaneously or, at least, a time difference between a point in time when the fluid front reaches the first outlet and a point in time when the fluid front reaches the second outlet may be reduced.

According to an embodiment, the device comprises at least three outlets distributed along a side surface of the chamber.

Having a large number of outlets arranged along the side surfaces of the reaction chamber may ensure that an entire volume of the reaction chamber is quickly filled when replacing fluids in the reaction chamber. For instance, a risk that a fluid to be replaced is trapped at a side surface of the reaction chamber between two outlets may be reduced. However, a large number of outlets may also increase complexity of a structure of the microfluidic device, so the number of outlets may be selected to provide a fast replacement of fluids while having a low complexity of the microfluidic device. In some embodiments, having two outlets may be sufficient. However, in many embodiments, having at least three outlets may ensure fast replacement of fluids in the reaction chamber.

According to an embodiment, the at least three outlets are distributed along at least a portion of a perimeter of the reaction chamber, wherein an equal distance is provided between adjacent outlets.

Having an equal distance between adjacent outlets may ensure that a diffusion distance between outlets is equal. This may ensure that fluid is not trapped for a long time at side surfaces of the reaction chamber between outlets.

It should be realized that the reaction chamber need not be provided with outlets along an entire perimeter of the reaction chamber. For instance, if supply channels are provided at one side of the perimeter of the reaction chamber (e.g. in a reaction chamber having a square shape), such side need not be provided with outlets.

In other embodiments, the distance between adjacent outlets may differ. This may still be effective in fast replacement of fluids within the reaction chamber.

According to an embodiment, the reaction chamber defines an area in a plane and the reaction chamber has a small thickness in a direction transverse to the plane, wherein the supply channels and outlets are connected to the reaction chamber in the plane.

The microfluidic device may be arranged in a plane, e.g. on a substrate. The microfluidic device may comprise several reaction chambers, and a vast number of channels within the plane of the microfluidic device. Thus, connections between different channels and between channels and reaction chambers may be defined within the plane of the microfluidic device. The reaction chamber may also have a shape in the plane, and the shape of the reaction chamber may be constant for an entire thickness of the reaction chamber in a direction transverse to the plane.

Typically, a thickness of the reaction chamber may be less than 1 mm.

According to an embodiment, the dimensions of the first outlet and the second outlet are set in dependence of mass diffusion coefficient of the first fluid and the second fluid.

Hence, the hydraulic resistance of the first outlet and the second outlet may be set in relation to the mass diffusion coefficient of the fluids to be entered into the reaction chamber. The mass diffusion coefficient may differ for different sets of fluids being used and by taking the mass diffusion coefficient into account, the outlets of the reaction chamber may be adapted to the fluids that are to be used with the reaction chamber.

However, it should also be realized that for many sets of fluids, the mass diffusion coefficient may be in a same order of magnitude. Then, a design of the reaction chamber may allow for sufficiently fast replacement of fluids for the sets of fluids without the precise mass diffusion coefficient of the fluids to be used being considered in design of the reaction chamber. Hence, the microfluidic device may be manufactured without knowledge of which fluids to be used with the microfluidic device and the microfluidic device may still be fit for use in many different applications.

According to an embodiment, the first outlet and the second outlet have different dimensions in at least one of a cross section or length for providing different hydraulic resistances.

The hydraulic resistance of an outlet may depend on dimensions of the outlet. Thus, by having different dimensions of the first outlet and the second outlet, the hydraulic resistance of the outlets may differ.

The first and second outlets may for instance have a circular cross section. Thus, dimensions of the cross section may differ in that a diameter of the cross section of the first and second outlets differ. According to an alternative, the first and second outlets may have rectangular (e.g. square) cross sections. Thus, dimensions of the cross section may differ in that a width or height of the cross section of the first and second outlets differ.

The length of an outlet may be defined as a length between the reaction chamber and a structure for collecting fluid being drained from the reaction chamber. For instance, the outlet may connect the reaction chamber to a larger main outlet in which fluid is collected.

The outlets may have constant cross sections over the entire length of the outlet. However, it should be realized that the outlets may alternatively have different cross sections in different portions of the outlet or a gradually changing cross section. Hence, the first outlet and the second outlet may have portions with common dimensions and other portions with different dimensions for providing different hydraulic resistances.

According to an embodiment, the first outlet and the second outlet are connected to a common main outlet for removing fluid from the device.

Thus, the first and the second outlet may ensure that the replacement of fluids in the reaction chamber is well-controlled. However, once the fluid has left the outlets, the fluid may be collected in a common main outlet for removing fluid from the reaction chamber in a single or a few main outlets. This implies that a system of channels for removing fluid from the reaction chamber need not be complex, even if the reaction chamber is provided with a large number of outlets.

The microfluidic device may comprise a plurality of main outlets, e.g. two main outlets. Each main outlet may receive fluid from a plurality of outlets connected to the reaction chamber.

According to an embodiment, the first outlet and the second outlet are associated with a common outlet for transporting the fluid exiting the reaction chamber through the first and second outlets to the common main outlet.

This implies that the first and second outlets may define paths for transporting fluid having simple shapes, whereas the common outlet may transport the fluid exiting the reaction chamber through the first and second outlets to a common main outlet for removing fluid from the microfluidic device.

According to an embodiment, each of the first outlet and the second outlet extends along a straight line between the reaction chamber and the common outlet.

According to an embodiment, the first supply channel and the second supply channel are connected to the reaction chamber in locations close to each other.

This implies that the fluids from the supply channels may enter the reaction chamber in a fairly common position, such that fluid flow in the reaction chamber may be similar for the replacement of the first fluid by the second fluid or the replacement of the second fluid by the first fluid. Hence, by the first supply channel and the second supply channel being connected to reaction chamber in locations close to each other, the reaction chamber may provide a good functionality for replacing fluids regardless of which supply channel that is feeding the fluid to be entered into the reaction chamber.

According to an embodiment, a separation between the locations in which the first supply channel and the second supply channel are connected to the reaction chamber is less than 25 μm, preferably less than 10 μm.

According to an embodiment, the microfluidic device further comprises a control unit for controlling a flowrate of the first supply channel, and the second supply channel.

The control unit may thus set the flowrate of the first supply channel and the second supply channel in order to control when replacement of fluids in the reaction chamber is to be performed. Also, while the reaction chamber is filled by a fluid that is to be maintained in the reaction chamber, the flowrate of the first supply channel and the second supply channel may be controlled to ensure that undesired fluid does not diffuse into the reaction chamber.

For instance, if the second supply channel feeds an undesired second fluid, the flowrate of the second supply channel may be set such that all the second fluid is transported away by the side drain of the second supply channel. Further, the first supply channel may feed the first fluid such that the amount of first fluid transported away by the side drain of the first supply channel, the side drain of the second supply channel and the outlets of the reaction chamber is continuously replaced so as to maintain the first fluid in the reaction chamber with a high purity.

According to an embodiment, dimensions of cross sections of the side drains are set for controlling a flowrate through the side drains.

The flowrate through the side drains may be purely controlled by the dimensions of cross sections of the side drains. Hence, no pump or other external device may be used for controlling the flowrate through the side drains.

The side drains may prevent undesired diffusion of a fluid into the reaction chamber. The flowrate through a side drain may be set by the dimensions of the side drain. Thus, the side drain may be dimensioned such that undesired diffusion is prevented.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
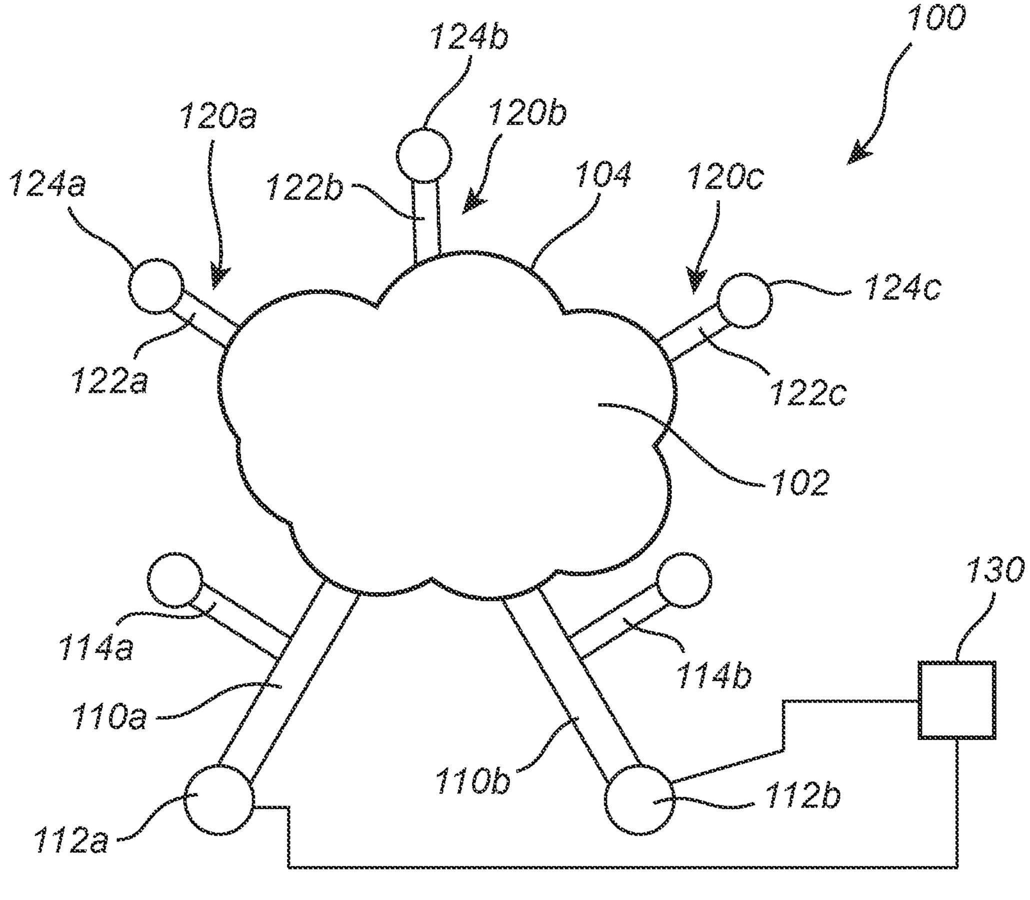
FIG. 1 is a schematic view of a microfluidic device according to an embodiment.

FIG. 1 illustrates a microfluidic device 100. The microfluidic device 100 comprises a reaction chamber 102 which may be supplied with different fluids. The reaction chamber 102 may be used for providing reactions therein, which may be studied.

The microfluidic device 100 may comprise a plurality of reaction chambers 102, which may be connected in an array and different fluids are provided through different channels of the microfluidic device 100.

The microfluidic device 100 may be formed on a substrate, e.g. a chip, which may include electronic circuitry, for example for controlling flow of fluids in the microfluidic device 100 and for providing sensors for performing measurements or acquiring information relating to reactions occurring in the microfluidic device 100. The flow of fluids in the microfluidic device 100 may be controlled by on-chip valves, but may also or alternatively be controlled by external valves and/or pumps.

The reaction chamber 102 may have any shape and is shown in FIG. 1 having an odd shape to illustrate that the shape may have various forms. However, it should be realized that the reaction chamber 102 may have a regular shape, such as a circular, rectangular or square shape.

The reaction chamber 102 may be arranged on the substrate and may be arranged in a plane defined by the substrate such that the shape of the reaction chamber 102 is defined in the plane.

The reaction chamber 102 may comprise side surfaces 104 that define a perimeter of the reaction chamber 102. The side surfaces 104 together with a top and bottom surface, which may be shared by several structures on the substrate, may define a volume of the reaction chamber 102 in which volume fluids may be received.

The reaction chamber 102 may be supplied with fluids from a plurality of supply channels 110*a*, 110*b*. As shown in FIG. 1, a first supply channel 110*a* and a second supply channel 110*b* may be provided. However, it should be realized that three or more supply channels may be provided. The supply channels may provide supply of different fluids.

The supply channels 110*a*, 110*b* may be connected to the reaction chamber 102 in the plane defined by the substrate for allowing transport of a respective fluid from a fluid supply source 112*a*, 112*b* into the reaction chamber 102. The fluid supply source 112*a*, 112*b* may be an inlet into the supply channel 110*a*, 110*b*, through which the fluid may be entered into the supply channel 110*a*, 110*b*. Fluid supply may be connected to the inlet for providing fluid into the supply channel 110*a*, 110*b*. The fluid supply may be configured to always provide supply of the same fluid. However, the fluid supply may be altered such that different fluids may be provided by the fluid supply channels 110*a*, 110*b* at different times, e.g. for different set-ups of reactions to be performed in the reaction chamber 102.

Each supply channel 110*a*, 110*b* may further be provided with a side drain 114*a*, 114*b*. The side drain 114*a*, 114*b* is connected to the supply channel 110*a*, 110*b* between the fluid supply source 112*a*, 112*b* and the reaction chamber 102.

The side drain 114*a*, 114*b* may be configured to provide a flow away from the supply channel 110*a*, 110*b*. This implies that, when the reaction chamber 102 is filled by a first fluid from the first supply channel 110*a*, the first fluid may exit the reaction chamber 102 through the side drain 110*b* of the second supply channel 110*b*. This implies that the first fluid will flow from the reaction chamber 102 to the side drain 110*b* of the second supply channel 110*b* and, hence, prevent diffusion of a second fluid from the fluid supply source 112*b* of the second supply channel 110*b* into the reaction chamber 102.

Hence, the side drains 114*a*, 114*b* may ensure a high purity of a fluid in the reaction chamber 102. The high purity may further be achieved without a need for valves to stop flow of the second fluid when the reaction chamber 102 is filled by the first fluid.

The supply of fluids into the reaction chamber 102 may be used e.g. for sequentially filling the reaction chamber 102 with different fluids. Thus, a sequence of reagents may for instance be loaded and washed from the reaction chamber, which may be used in various applications, such as for DNA synthesis.

The microfluidic device 100 may further comprise a plurality of outlets 120*a*, 120*b*, 120*c*. The outlets 120*a*, 120*b*, 120*c* are connected to the reaction chamber 102 in the plane defined by the substrate for allowing transport of fluid from the reaction chamber 102. Thus, when a first fluid is to be replaced by a second fluid in the reaction chamber 102, the first fluid may exit the reaction chamber 102 through the outlets 120*a*, 120*b*, 120*c*.

The reaction chamber 102 may be associated with at least two outlets. However, in many embodiments, a large number of outlets 120*a*, 120*b*, 120*c* may be desired in order to facilitate fast replacement of the first fluid by the second fluid, as will be described later.

The outlets 120*a*, 120*b*, 120*c* may be distributed along the perimeter of the reaction chamber 102 as defined by the side surfaces 104. Thus, the outlets 120*a*, 120*b*, 120*c* may be distanced from each other in order to facilitate removal of a fluid from the entire volume of the reaction chamber 102.

The outlets 120*a*, 120*b*, 120*c* may each provide an outlet channel 122*a*, 122*b*, 122*c* which may connect the reaction chamber 102 to a main outlet 124*a*, 124*b*, 124*c*. Fluid may exit the outlet channel 122*a*, 122*b*, 122*c* through the main outlet 124*a*, 124*b*, 124*c* and may be further transported, e.g. to waste or to further analysis of the fluid.

The outlets 120*a*, 120*b*, 120*c* may be associated with a common main outlet such that the outlet channels 122*a*, 122*b*, 122*c* may end in an interconnected channel, which may further lead to the main outlet. The side drains 114*a*, 114*b* may also be associated with the common main outlet.

The outlets 120*a*, 120*b*, 120*c* may be arranged at different distances from the respective supply channels 110*a*, 110*b*. This implies that, for example, a travel distance from a first supply channel 110*a* to a first outlet 120*a* is different from a travel distance from the first supply channel 110*a* to a second outlet 120*b* and further different from a travel distance from the first supply channel 110*a* to a third outlet 120*c*.

The difference in travel distances may affect how a fluid front propagates through the reaction chamber 102 when the first fluid is to be replaced by the second fluid. Thus, if the fluid front reaches a first outlet 120*a* first, fluid may be transported between the second supply channel 110*b* and the first outlet 120*a* and further exit the reaction chamber 102, without the fluid front of the second fluid propagating to the second and third outlets 120*b*, 120*c*, or the fluid front slowly propagating towards the second and third outlets 120*b*, 120*c*.

The outlets 120*a*, 120*b*, 120*c* may therefore be provided with different hydraulic resistances. This implies that a resistance experienced by the second fluid which is to replace the first fluid in the reaction chamber 102 may be different in different directions from the second supply channel 110*b*. Hence, the fluid front of the second fluid may propagate with different speeds in different directions. This may be utilized such that the reaction chamber 102 may be very quickly filled in the entire volume by the second fluid when fluid replacement is performed. The fluid front may reach the outlets 120*a*, 120*b*, 120*c* simultaneously or approximately simultaneously such that filling of the entire volume of the reaction chamber 102 by the second fluid is facilitated. Hence, the hydraulic resistance of an outlet that is associated with a large travel distance from a supply channel may be set to be low while the hydraulic resistance of an outlet that is associated with a short travel distance from a supply channel may be set to be high. Thus, if the second outlet 120*b* is arranged farther away from the first supply channel 110*a* and the second supply channel 110*b* than the first outlet 120*a*, the second outlet 120*b* may be provided with a lower hydraulic resistance than the first outlet 120*a*.

The outlets 120*a*, 120*b*, 120*c* may be distributed along at least a portion of the perimeter of the reaction chamber 102. This may imply that, with a difference in hydraulic resistances between the outlets 120*a*, 120*b*, 120*c*, the fluid front of the second fluid may reach the side surfaces 104 of the reaction chamber 102 simultaneously such that the second fluid very quickly fills the reaction chamber 102.

It should be realized that a shape of the reaction chamber 102, locations in which the supply channels 110*a*, 110*b* are connected to the reaction chamber 102 and locations in which the outlets 120*a*, 120*b*, 120*c* may be altered in many different ways while enabling a fast replacement of fluids in the reaction chamber 102. The hydraulic resistances of the outlets 120*a*, 120*b*, 120*c* may be adapted to the shape of the reaction chamber 102 and the travel distances between the supply channels 110*a*, 110*b* and the outlets 120*a*, 120*b*, 120*c* in the reaction chamber.

It should also be realized that the hydraulic resistances need not necessarily be designed such that an optimum speed of replacement of fluids is provided. However, by having different hydraulic resistances of the outlets 120*a*, 120*b*, 120*c*, the speed of replacement of fluids may be improved to a sufficient or acceptable extent. Hence, the hydraulic resistances of the outlets 120*a*, 120*b*, 120*c* need not be set such that the fluid front of the second fluid entering the reaction chamber needs to exactly simultaneously reach the outlets 120*a*, 120*b*, 120*c*. Rather, the fluid front may reach the outlets at quite different times while still ensuring that the speed of replacement of fluids is acceptable.

The hydraulic resistance of an outlet 120*a*, 120*b*, 120*c* may depend on dimensions of the outlet 120*a*, 120*b*, 120*c*. Thus, by having different dimensions of the first outlet 120*a*, the second outlet 120*b* and the third outlet 120*c*, the hydraulic resistance of the outlets 120*a*, 120*b*, 120*c* may differ.

The outlets 120*a*, 120*b*, 120*c* may for instance have a circular cross section. Thus, dimensions of the cross section may differ in that a diameter of the cross section of the outlets 120*a*, 120*b*, 120*c* differ and the hydraulic resistances may correspondingly differ. According to an alternative, the outlets 120*a*, 120*b*, 120*c* may have rectangular (e.g. square) cross sections. Thus, dimensions of the cross section may differ in that a width or height of the cross section of the outlets 120*a*, 120*b*, 120*c* differ and the hydraulic resistances may correspondingly differ.

The length of the outlet channel 122*a*, 122*b*, 122*c* may alternatively or additionally differ between the outlets 120*a*, 120*b*, 120*c* such that the hydraulic resistances may correspondingly differ.

The first supply channel 110*a* and the second supply channel 110*b* may be connected to the reaction chamber 102 in locations close to each other.

This implies that the fluids from the supply channels 110*a*, 110*b* may enter the reaction chamber in locations close to each other, such that a travel distance between outlets 120*a*, 120*b*, 120*c* and the supply channels 110*a*, 110*b* is similar for all the supply channels 110*a*, 110*b*. Hence, the differences in travel distances through the reaction chamber 102 associated with the outlets 120*a*, 120*b*, 120*c* may be similar for all supply channels 110*a*, 110*b* such that the hydraulic resistance of the outlets 120*a*, 120*b*, 120*c* may be suitable for replacement of fluids in the reaction chamber 102 regardless through which supply channel 110*a*, 110*b* the fluid to be entered into the reaction chamber 102 is supplied.

According to an embodiment, a separation between the locations in which the first supply channel 110*a* and the second supply channel 110*b* are connected to the reaction chamber 102 is less than 25 μm, preferably less than 10 μm. Such small separation distances may easily be achieved using semiconductor fabrication technology for manufacturing of the microfluidic device 100.

Referring now to FIGS. 2*a-d*, replacement of fluids in the reaction chamber 102 will be described.

In the embodiment shown in FIGS. 2*a-d*, the reaction chamber 102 has a square shape and is provided with outlets 120*a*-120*m* along a perimeter of the reaction chamber 102. As illustrated in FIGS. 2*a-d*, the outlets 120*a*-120*m* may be equally spaced along each side of the square reaction chamber 102. However, it is not necessary to have outlets 120*a*-120*m* distributed along the entire perimeter of the reaction chamber 102. For instance, at a side of the reaction chamber 102 in which the supply channels 110*a*, 110*b* are connected to the reaction chamber 102, there is no need to have outlets 102. Rather, the fluid to be replaced at this side of the reaction chamber 102 will anyway be removed from the reaction chamber 102 through the outlets 120*a*, 120*m* arranged at corners of the reaction chamber 102 associated with the side.

The outlets 120*a*-120*m* may be associated with a common outlet busbar 126, which is used for transporting fluid from the outlet channels to a common main outlet 124. The outlet busbar 126 may thus transport the fluid, regardless of where the fluid exits the reaction chamber 102 to the common main outlet 124, such that a single main outlet 124 need to be provided for the reaction chamber 102. Thus, the microfluidic device 100 need not have a complex structure including many long outlet channels, even though the reaction chamber 102 has many outlets 120*a*-120*m*. It should be realized that the outlets 120*a*-120*m* need not necessarily be connected to a single main outlet but may rather be connected to a plurality of main outlets, wherein the number of main outlets is smaller than the number of outlets 120*a*-120*m* from the reaction chamber 102, such as two main outlets.

FIGS. 2*a-d* illustrate replacement of a first fluid (indicated by a light shaded area in FIGS. 2*a-d*) in the reaction chamber 102 supplied through the first supply channel 110*a* by a second fluid (indicated by a dark shaded area in FIGS. 2*a-d*) supplied through the second supply channel 110*b*.

The hydraulic resistances of the outlets 120*a*-120*m* are set in order to promote that the fluid front of the second fluid entering the reaction chamber 102 propagates quickly towards all outlets 120*a*-120*m*.

Figure 2A:
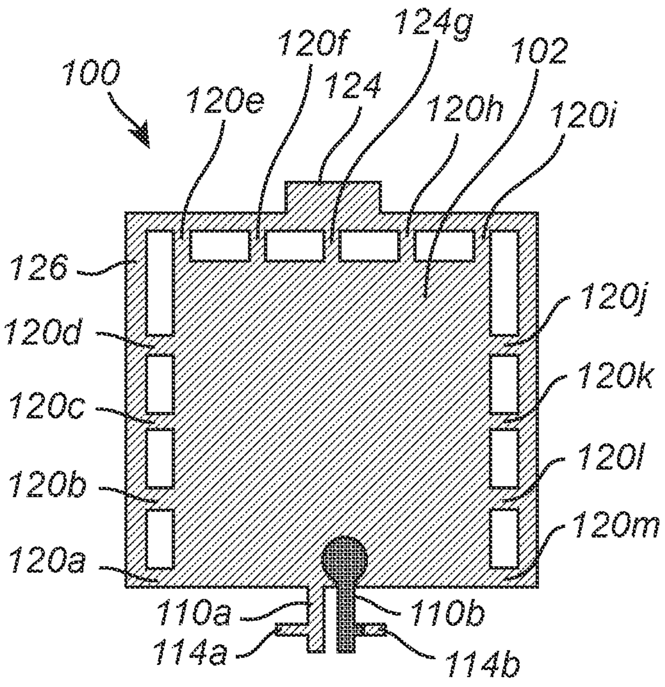
FIGS. 2*a-d* are schematic views of a microfluidic device according to an embodiment illustrating replacement of a first fluid by a second fluid in a reaction chamber of the microfluidic device.

FIG. 2*a* illustrates an initial stage of fluid replacement, wherein second fluid from the second supply channel 110*b* has just escaped the supply channel 110*b* into the reaction chamber 102. As is clear from FIG. 2*a*, the first fluid is also present in the side drain 114*b* of the second supply channel 110*b* before the fluid replacement and the first fluid in the side drain 114*b* is transported away by the second fluid being supplied through the second supply channel 110*b*.

Figure 2B:
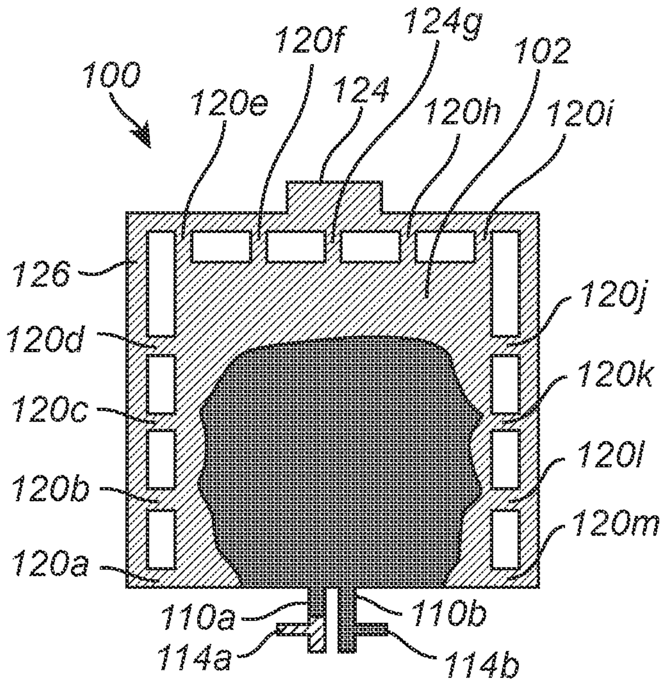

FIG. 2*b* illustrates a stage wherein the fluid front of the second fluid has moved well into the reaction chamber 102. As is clear from FIG. 2*b*, the second fluid fills an entire width of the reaction chamber 102 so as to quickly push away all the first fluid from the reaction chamber 102. The second fluid has also entered into the first supply channel 110*a* towards the side drain 114*a* so as to prevent further diffusion of the first fluid from the first supply channel 110*a* into the reaction chamber 102.

Figure 2C:
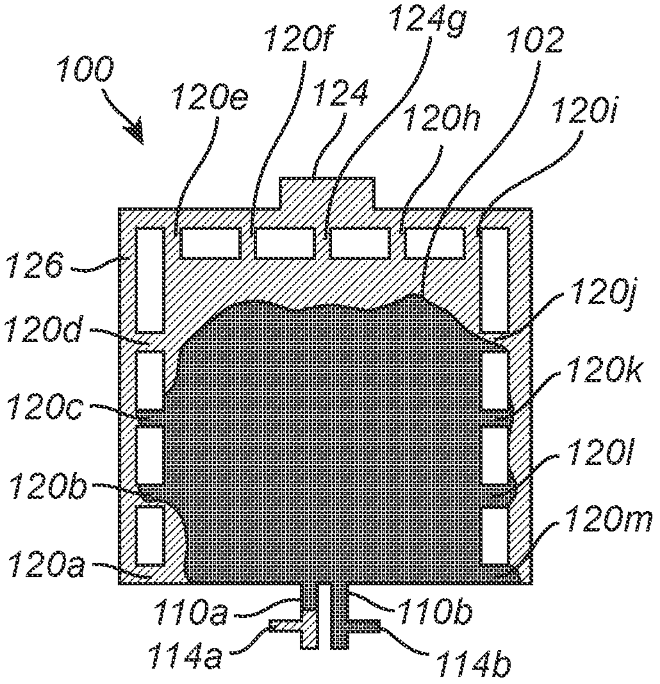

FIG. 2*c* illustrates a stage wherein the fluid front of the second fluid has reached several outlets 120*b*, 120*c*, 120*d*, 120*j*, 120*k*, 120*l*, 120*m* and the second fluid starts to be transported through the outlets 120*b*, 120*c*, 120*d*, 120*j*, 120*k*, 120*l*, 120*m* such that the first fluid at these outlets has been pushed away from the reaction chamber 102. As is clear from FIG. 2*c*, the fluid front may reach the outlets 120*b*, 120*c*, 120*d*, 120*j*, 120*k*, 120*l*, 120*m* simultaneously or at least fairly simultaneously such that the reaction chamber 102 is being filled entirely by the second fluid. The fluid front has not yet filled the reaction chamber 102 in a main forward direction between the supply channel 110*b* and the main outlet 124. Thus, the fluid front does not reach all the outlets 120*a*-120*m* simultaneously. However, since the fluid is to be transported away through the main outlet 124, the second fluid will fill also quickly fill the reaction chamber 102 at the remaining outlets that are close to the main outlet 124.

Figure 2D:
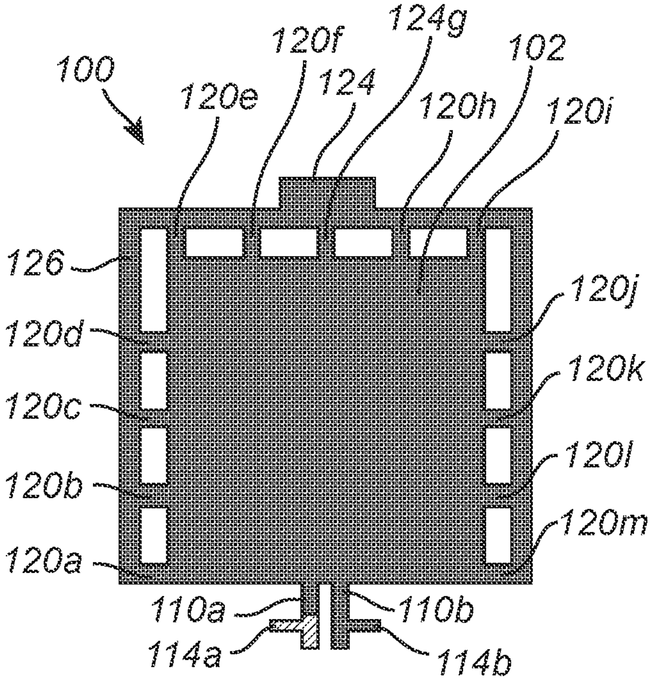

FIG. 2*d* illustrates a stage wherein the second fluid has completely replaced the first fluid in the reaction chamber 102.

Referring again to FIG. 1, the microfluidic device 100 may further comprise a control unit 130 for controlling a flowrate of the first supply channel 110*a* and the second supply channel 110*b*.

The control unit 130 may thus control the flowrates which may control that a desired fluid is maintained in the reaction chamber 102 and which may control replacement of fluids within the reaction chamber 102.

The control unit 130 may provide control signals to pumps and/or valves associated with the first supply channel 110*a* and the second supply channel 110*b* for controlling the flowrates.

The control unit 130 may be provided on a common substrate with the microfluidic device 100 such that a self-contained microfluidic device 100 may be provided on the substrate. According to an alternative, the control unit 130 may be provided externally to the substrate.

The control unit 130 may receive input, such as manual input, for triggering replacement of fluids. Alternatively, the control unit 130 may comprise instructions for providing a timed sequence of fluids within the reaction chamber 102 and the control unit 130 may automatically process these instructions for controlling the fluids within the reaction chamber 102.

The control unit 130 may be implemented as a processing unit, such as a central processing unit (CPU), which may execute the instructions of one or more computer programs in order to implement functionality of the control unit 130.

The control unit 130 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the control unit 130.

The control unit 130 may also comprise a memory or have access to a memory for storing instructions.

Figure 3:
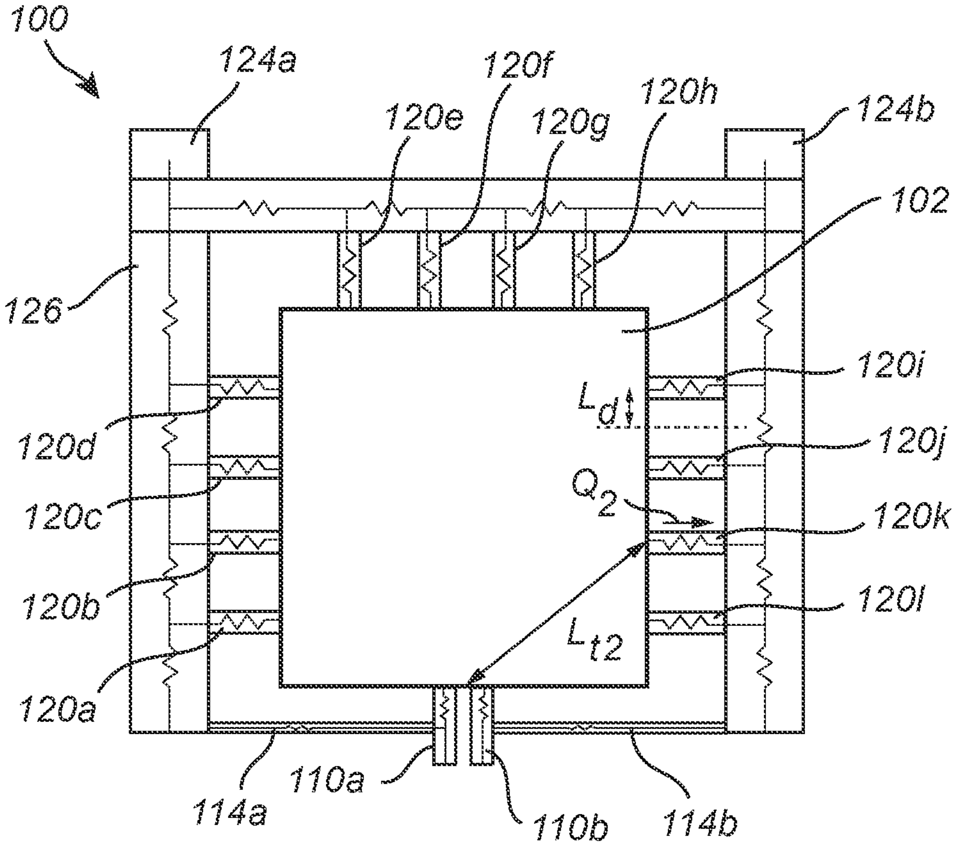
FIG. 3 is a schematic view of a microfluidic device according to an embodiment illustrating a hydraulic resistance network.

Referring now to FIG. 3, considerations in design of a reaction chamber 102, supply channels 110*a*, 110*b* and outlets 120*a*-120*l* will be discussed.

FIG. 3 illustrates a hydraulic resistance network through the supply channels 110*a*, 110*b*, the side drains 114*a*, 114*b*, the outlets 120*a*-120*l*, an outlet busbar 126 and main outlets 124*a*, 124*b*.

The design of a reaction chamber 102 may be initiated by setting a desired rinsing time and size and shape of the reaction chamber 102 and connections to the supply channels 110*a*, 110*b* as design inputs.

The rinsing time $T_R$ is a total time required to replace the fluid in the reaction chamber 102 with another fluid and can be divided into travel time $T_t$ which is the time at which the fluid front arrives at sides of the reaction chamber 102 and diffusion time $T_D$ which is the time required for the first fluid to flow out of the reaction chamber 102 through the outlets 120*a*-120*l* by diffusion $$T_R = T_t + T_D \qquad \text{(equation 1)}$$

Based on the design inputs, a number of the outlets 120*a*-120*l* may be determined by dividing the perimeter of the reaction chamber 102 over an interval length between two adjacent outlets $L_s$. The interval length can be calculated using the following equations $$L_s = 2 * L_D \qquad \text{(equation 2)}$$

$$L_D = \sqrt{\frac{T_D D}{K}} \qquad \text{(equation 3)}$$

where $L_D$ is a diffusion length as illustrated in FIG. 3, $T_D$ is the diffusion time, K is a proportionality constant that can be estimated using numerical simulation, and D is a mass diffusion coefficient of the first fluid into the second fluid.

Having determined a number of outlets 120*a*-120*l* to be used, the flowrates in the channels of the microfluidic device 100 and the dimensions of channels may be determined through a plurality of equations, which define an equation system for solving the flowrates and setting the dimensions.

The flowrate in the side drains 114*a*, 114*b* can be determined using the following equation $$Q_s = DA_s \frac{\partial C}{\partial x} \qquad \text{(equation 4)}$$

where $Q_s$ is the flowrate in the side drain 114*a*, 114*b*, D is the mass diffusion coefficient of the first fluid into the second fluid, $A_s$ is a cross-sectional area of the side drain and $$\frac{\partial C}{\partial x}$$

is a gradient of the concentration of the undesired fluid in the supply channel 110*a*, 110*b* which can be calculated either analytically or using numerical simulation. It should be noted that the concentration of the undesired fluid should go to zero at the connection between the supply channel 110*a*, 110*b* into the reaction chamber 102 for a supply channel 110*a*, 110*b* that transports an undesired fluid.

The flowrate in the outlets 120*a*-120*l* can be estimated from the equation $$Q_i = \frac{A_i L_{ti}}{T_t} \qquad \text{(equation 5)}$$

where $Q_i$ is a flowrate, $A_i$ is a cross-sectional area and $L_{ti}$ (as illustrated in FIG. 3) is the travel distance of an $i^{th}$ side channel, respectively, and $T_t$ is the travel time.

The supply channel flowrate ($Q_{inlet}$) is equal to the sum of the side drain flowrate and the outlet flowrates $$Q_{inlet}=m*Q_s+\Sigma_{i=1}^{n}Q_i \qquad \text{(equation 6)}$$

where m is a number of supply channels 110*a*, 110*b* and *n* is the number of outlets 120*a*-120*l*.

Further, the hydraulic resistance ($R_h$) of each component of the microfluidic device can be described by setting the equivalent resistance network illustrated in FIG. 3. Then, the geometrical parameter of each component can be determined from the following equation (example for a rectangular shaped microchannel):

$$R_h = \frac{12l}{wh^3}\left[1 - \frac{192h}{\pi^5 w}\sum_{i=1,3,\ldots}^{\infty}\frac{\tanh\left(\frac{i\pi w}{2h}\right)}{i^5}\right]^{-1} \qquad \text{(equation 7)}$$

where $R_h$ is the hydraulic resistance of a rectangular shaped channel of height h, width w and length l.

Having set a desired rinsing time as a design input and using the above equations 2-7, suitable dimensions of the outlets 120*a*-120*l*, the side drains 114*a*, 114*b* and the flowrate to be applied to the supply channels 110*a*, 110*b* may be determined.

However, it should be realized that even though appropriate characteristics of the microfluidic device 100 may be analytically determined, it may not be necessary to determine the design of the microfluidic device 100 in this manner. Rather, a simple approach may be used, wherein outlets 120 are distributed along a perimeter of the reaction chamber 102 and provided with hydraulic resistances inversely dependent on a distance from the supply channels 110*a*, 110*b*. In such manner, a microfluidic device 100 having adequate characteristics for replacement of fluids in the reaction chamber 102 may be achieved.

Further, it should be noted that, in the above equations, the mass diffusion coefficient of the first fluid into the second fluid is included. Hence, the microfluidic device 100 may be designed to be adapted for use with particular fluids. However, the mass diffusion coefficient may be similar for various fluids and hence the microfluidic device 100 may be designed with a default value of the mass diffusion coefficient and the microfluidic device 100 may still be suitable for use with many different fluids.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A microfluidic device comprising:

a reaction chamber;

a first supply channel and a second supply channel connected to the reaction chamber, the first supply channel and the second supply channel configured to transport a first fluid and a second fluid, respectively, from a fluid supply source into the reaction chamber, wherein the first supply channel comprises a first side drain connected to the first supply channel between the fluid supply source and the reaction chamber, wherein the second supply channel comprises a second side drain connected to the second supply channel between the fluid supply source and the reaction chamber, wherein the first side drain is dimensioned to drain the second fluid from the reaction chamber through the first side drain while preventing diffusion of the first fluid into the reaction chamber during filling of the reaction chamber with the second fluid, wherein the second side drain is dimensioned to drain the first fluid from the reaction chamber through the second side drain while preventing diffusion of the second fluid into the reaction chamber during filling of the reaction chamber with the first fluid; and at least three outlets connected to the reaction chamber at locations being equally spaced along a side surface of the reaction chamber, the at least three outlets being of equal length, the at least three outlets including a first outlet and a second outlet, and the at least three outlets provide different hydraulic resistance to transporting at least one of the first fluid or the second fluid from the reaction chamber, and wherein the first supply channel and the second supply channel are connected to the reaction chamber at locations different from the locations at which the at least three outlets are connected to the reaction chamber.

2. The microfluidic device according to claim 1, wherein the second outlet is arranged farther away from the first supply channel and the second supply channel than the first outlet, wherein the second outlet has a lower hydraulic resistance than the first outlet.

3. The microfluidic device according to claim 1, wherein the reaction chamber defines an area in a plane and the reaction chamber has a small thickness in a direction transverse to the plane, wherein the first and second supply channels and the first and second outlets are connected to the reaction chamber in the plane.

4. The microfluidic device according to claim 1, wherein the dimensions of the first outlet and the second outlet are set in dependence of mass diffusion coefficient of the first fluid and the second fluid.

5. The device according to claim 1, wherein the first outlet and the second outlet have different dimensions in a cross section for providing different hydraulic resistance.

6. The microfluidic device according to claim 1, wherein the first outlet and the second outlet are connected to a common main outlet for removing fluid from the device.

7. The microfluidic device according to claim 6, wherein the first outlet and the second outlet are associated with a common outlet for transporting at least one of the first or second fluid exiting the reaction chamber through the first and second outlets to the common main outlet.

8. The microfluidic device according to claim 7, wherein each of the first outlet and the second outlet extends along a straight line between the reaction chamber and the common outlet.

9. The microfluidic device according to claim 1, wherein the first supply channel and the second supply channel are connected to the reaction chamber in locations close to each other.

10. The microfluidic device according to claim 1, further comprising a control unit for controlling a flowrate of the first supply channel and the second supply channel.

11. The microfluidic device according to claim 1, wherein dimensions of cross sections of the first and second side drains are set for controlling a flowrate through the first and second side drains.

* * * * *